US009988473B2

(12) United States Patent
Kapur et al.

(10) Patent No.: US 9,988,473 B2
(45) Date of Patent: Jun. 5, 2018

(54) POLYETHYLENE COMPOSITION AND ARTICLES MADE THEREFROM

(71) Applicant: Dow Global Technologies LLC, Midland, MI (US)

(72) Inventors: Mridula Kapur, Lake Johnson, TX (US); Mark B. Davis, Lake Johnson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days. days.

(21) Appl. No.: 14/785,727

(22) PCT Filed: Apr. 22, 2014

(86) PCT No.: PCT/US2014/034881
§ 371 (c)(1),
(2) Date: Oct. 20, 2015

(87) PCT Pub. No.: WO2014/179103
PCT Pub. Date: Nov. 6, 2014

(65) Prior Publication Data
US 2016/0068623 A1    Mar. 10, 2016

Related U.S. Application Data

(60) Provisional application No. 61/818,540, filed on May 2, 2013.

(51) Int. Cl.
*C08F 210/02* (2006.01)
*C08F 210/16* (2006.01)

(52) U.S. Cl.
CPC .......... *C08F 210/02* (2013.01); *C08F 210/16* (2013.01)

(58) Field of Classification Search
CPC .............................. C08F 210/02; C08F 210/16
See application file for complete search history.

(56) References Cited

U.S. PATENT DOCUMENTS 2,825,721 A   3/1958   Hogan et al.
3,622,521 A   11/1971  Hogan et al.
(Continued)

FOREIGN PATENT DOCUMENTS

EP        1972642        9/2008
WO    WO2005/103095     11/2005
(Continued)

OTHER PUBLICATIONS

Cox et al., "Understanding Rheology of Thermoplastic Polymers," J. Polym. Sci., 28, 118 (1958).*
(Continued)

*Primary Examiner* — Catherine S Branch
(74) *Attorney, Agent, or Firm* — Brooks, Cameron & Huebsch, PLLC

(57) ABSTRACT

A polyethylene composition comprising at least 95 percent by weight of the units derived from ethylene; less than 5 percent by weight of units derived from one or more α-olefin comonomers; wherein said polyethylene composition has a density in the range of 0.930 to 0.945 g/cm³, a molecular weight distribution characterized by the ratio of the z-average molecular weight to the weight average molecular weight (Mz/Mw) less than 5, a melt index, $I_2$ (measured at 190° C., 2.16 kg), in the range of 0.08 to 0.5 g/10 minutes, and a high flow melt index, $I_{21}$ (measured at 190° C., 21.6 kg), in the range from 10 to 20 g/10 minutes; and wherein the polyethylene composition is produced utilizing a chromium oxide catalyst is provided.

10 Claims, 1 Drawing Sheet

(56) References Cited

U.S. PATENT DOCUMENTS

| | | | |
|---|---|---|---|
| 4,011,382 | A | 3/1977 | Levine et al. |
| 4,543,399 | A | 9/1985 | Jenkins, III et al. |
| 4,621,952 | A | 11/1986 | Aronson |
| 4,933,149 | A | 6/1990 | Rhee et al. |
| 5,405,922 | A | 4/1995 | DeChellis et al. |
| 5,462,999 | A | 10/1995 | Griffin et al. |
| 6,485,662 | B1 | 11/2002 | Neubauer et al. |
| 6,627,713 | B2 | 9/2003 | Bernier et al. |
| 9,303,103 | B2 | 4/2016 | Moorhouse et al. |
| 2011/0092937 | A1* | 4/2011 | Pepper .................. C08L 23/04 604/372 |

FOREIGN PATENT DOCUMENTS

| | | | |
|---|---|---|---|
| WO | WO2007/118866 | 10/2007 | |
| WO | WO 2011085375 A1 * | 7/2011 | ............. C08J 5/18 |

OTHER PUBLICATIONS

PCT Search Report dated Jul. 18, 2014; from PCT counterpart Application No. PCT/US2014/034881.
PCT IPRP dated Nov. 3, 2015; from PCT counterpart Application No. PCT/US2014/034881.
EP Office Action dated Dec. 9, 2015; from EP counterpart Application No. 14727123.3.
EP Response to Office Action dated Jun. 2, 2016; from EP counterpart Application No. 14 727 123.3.
Russian Office Action dated Jun. 11, 2016; from Russian counterpart Application No. 2015150726.
Chinese Office Action dated Nov. 15, 2016; from counterpart Chinese Application No. 201480023980.5.

* cited by examiner

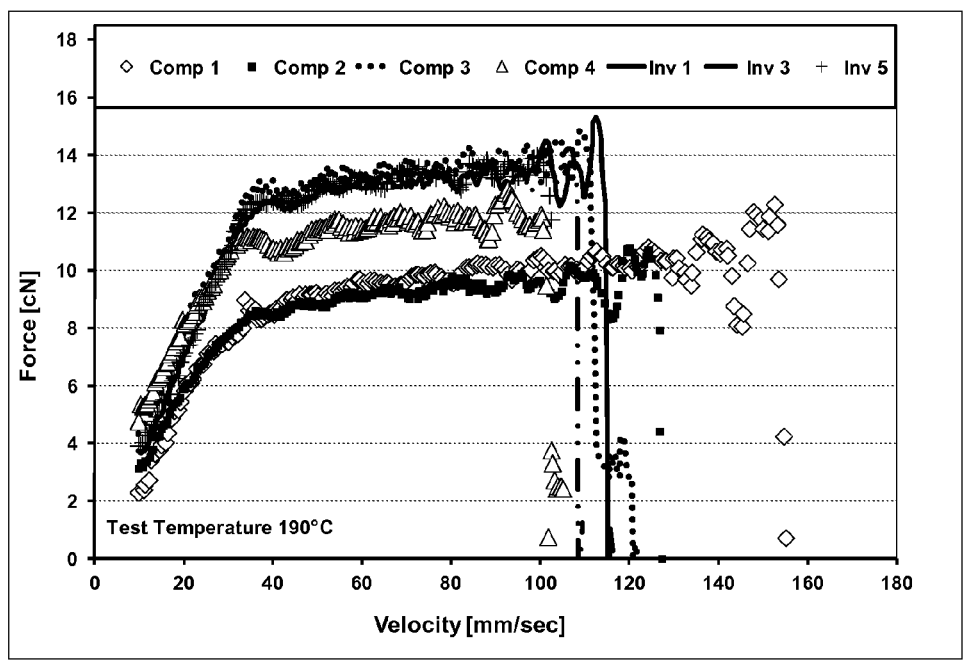

POLYETHYLENE COMPOSITION AND ARTICLES MADE THEREFROM

FIELD

The instant invention relates to a polyethylene composition and articles made therefrom.

BACKGROUND

Chromium containing catalysts are typically used to produce polyethylene compositions having high density, broad molecular weight distributions and fractional melt indices. With such properties, good operability during the polymerization process (e.g., no fouling in reactor, low static) is achieved. Medium density polyethylene compositions tend to maintain good operability but also do not show sufficient improvement in optics for such end uses. Low density polyethylene compositions provide more improved optics but the polymerization reactors experience greater fouling and static.

SUMMARY

The instant invention is a polyethylene composition and articles made therefrom

In one embodiment, the instant invention provides a composition comprising: at least 95 percent by weight of the units derived from ethylene; less than 5 percent by weight of units derived from one or more α-olefin comonomers; wherein said polyethylene composition has a density in the range of 0.930 to 0.945 g/cm$^3$, a molecular weight distribution characterized by the ratio of the z-average molecular weight to the weight average molecular weight (Mz/Mw) less than 5, a melt index, $I_2$ (measured at 190° C., 2.16 kg), in the range of 0.08 to 0.5 g/10 minutes, and a high load melt index, $I_{21}$ (measured at 190° C., 21.6 kg), in the range from 10 to 20 g/10 minutes; and wherein the polyethylene composition is produced utilizing a chromium oxide catalyst.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a graph illustrating the melt strength of Inventive Examples 1-5 and Comparative Examples 1-4.

DETAILED DESCRIPTION

The instant invention is a polyethylene composition and articles made therefrom.

The polyethylene composition according to the present invention comprises: at least 95 percent by weight of the units derived from ethylene; less than 5 percent by weight of units derived from one or more α-olefin comonomers; wherein said polyethylene composition has a density in the range of 0.930 to 0.945 g/cm$^3$, a molecular weight distribution characterized by the ratio of the z-average molecular weight to the weight average molecular weight (Mz/Mw) less than 5, a melt index, $I_2$ (measured at 190° C., 2.16 kg), in the range of 0.08 to 0.5 g/10 minutes, and a high load melt index, $I_{21}$ (measured at 190° C., 21.6 kg), in the range from 10 to 20 g/10 minutes; and wherein the polyethylene composition is produced utilizing a chromium oxide catalyst.

Articles according to the present invention include articles comprising the composition according to any embodiment described herein.

The polyethylene composition according to the present invention comprises: at least 95 percent by weight of the units derived from ethylene. All individual values and subranges from at least 95 percent by weight are included herein and disclosed herein. For example, the amount of units derived from ethylene may be at least 95 percent by weight, or in the alternative, the amount of units derived from ethylene may be at least 96 percent by weight, or in the alternative, the amount of units derived from ethylene may be at least 97 percent by weight, or in the alternative, the amount of units derived from ethylene may be at least 98 percent by weight, or in the alternative, the amount of units derived from ethylene may be at least 99 percent by weight.

The polyethylene composition according to the present invention comprises: at least 95 percent by weight of the units derived from less than 5 percent by weight of units derived from one or more α-olefin comonomers. All individual values and subranges from less than 5 percent by weight are included herein and disclosed herein. For example, the amount of units derived from one or more α-olefin comonomers may be less than 5 percent by weight, or in the alternative, the amount of units derived from one or more α-olefin comonomers may be less than 4 percent by weight, or in the alternative, the amount of units derived from one or more α-olefin comonomers may be less than 3 percent by weight, or in the alternative, the amount of units derived from one or more α-olefin comonomers may be less than 2 percent by weight, or in the alternative, the amount of units derived from one or more α-olefin comonomers may be less than 1 percent by weight.

The polyethylene composition has a density in the range of 0.930 to 0.945 g/cm$^3$. All individual values and subranges from 0.930 to 0.945 g/cm$^3$ are included herein and disclosed herein; for example, the polyethylene composition can have a density with a lower limit of 0.930, 0.934, 0.938, 0.941, or 0.944 g/cm$^3$ to an upper limit of 0.931, 0.925, 0.939, 0.942, or 0.945 g/cm$^3$. For example, the density may be from 0.930 to 0.945 g/cm$^3$, or in the alternative, the density may be from 0.934 to 0.942 g/cm$^3$, or in the alternative, the density may be from 0.930 to 0.940 g/cm$^3$, or in the alternative, the density may be from 0.938 to 0.945 g/cm$^3$.

The polyethylene composition has a molecular weight distribution characterized by the ratio of the z-average molecular weight to the weight average molecular weight (Mz/Mw) less than 5. All individual values and subranges from less than 5 are included herein and disclosed herein. For example, the Mz/Mw may be less than 5, or in the alternative, the Mz/Mw may be less than 4.5, or in the alternative, the Mz/Mw may be less than 4.

The polyethylene composition has a melt index, $I_2$ (measured at 190° C., 2.16 kg), in the range of 0.08 to 0.5 g/10 minutes. All individual values and subranges from 0.08 to 0.5 g/10 minutes (g/10 mins) are included herein and disclosed herein; for example, the $I_2$ may be from a lower limit of 0.08, 0.1, 0.2, 0.3, or 0.4 g/10 mins to an upper limit of 0.1, 0.2, 0.32, 0.44, or 0.5 g/10 mins. For example, the $I_2$ can range from 0.08 to 0.5 g/10 mins, or in the alternative, the $I_2$ can range from 0.08 to 0.25 g/10 mins, or in the alternative, the $I_2$ can range from 0.25 to 0.5 g/10 mins, or in the alternative, the $I_2$ can range from 0.1 to 0.4 g/10 mins.

The polyethylene composition has a high load melt index, $I_{21}$ (measured at 190° C., 21.6 kg), in the range from 10 to 20 g/10 minutes. All individual values and subranges from 10 to 20 g/10 minutes are included herein and disclosed herein; for example, the $I_{21}$ may be from a lower limit of 10, 12, 14, 16, or 18 g/10 mins to an upper limit of 11, 13, 15, 17, 19 or 20 g/10 mins. For example, the $I_{21}$ of the polyethylene composition can range from 10 to 20 g/10 mins, or in the alternative, the $I_{21}$ of the polyethylene composition can range from 15 to 20 g/10 mins, or in the alternative, the $I_{21}$ of the polyethylene composition can range from 10 to 15 g/10 mins, or in the alternative, the $I_{21}$ of the polyethylene composition can range from 12 to 18 g/10 mins.

The polyethylene composition is produced utilizing a chromium oxide based catalyst. Chromium oxide based catalysts useful in producing the polyethylene composition according to the embodiments disclosed herein include those disclosed in U.S. Pat. No. 4,011,382, the disclosure of which is incorporated herein by reference in its entirety. Such chromium oxide ($CrO_3$) based catalysts may be formed by depositing a suitable chromium compound, titanium compound, and optionally a fluorine compound on a dried support, and then activating the resulting composition by heating it in air or oxygen at a temperature of 300° C. to 900° C., for at least 2 hours. Chromium compounds which may be used include $CrO_3$ and other chromium containing compounds which are convertible to $CrO_3$ under the catalyst preparation conditions, including for example, chromic acetyl acetonate, chromic nitrate, chromic acetate, chromic chloride, chromic sulfate, and ammonium chromate. Other chromium compounds include those disclosed in U.S. Pat. Nos. 2,825,721 and 3,622,521, the disclosures of which are incorporated herein by reference in their entireties. In some embodiments, the chromium oxide catalyst comprises from greater than zero to 2.5 weight percent of fluorine. All individual values and subranges from greater than zero to 2.5 weight percent fluorine are included herein and disclosed herein; for example, when present, the fluorine may be from a lower limit of 0.01, 0.1, 0.5, 1, 1.5, 2, or 2.25 weight percent to an upper limit of 0.1, 0.5, 1, 1.5, 2, or 2.5 weight percent based on the total weight of the support and the catalyst. The chromium oxide based catalyst may have from 0.05 to 3.0 weight percent chromium based on the total weight of the support and the catalyst. All individual values and subranges from 0.05 to 3.0 weight percent are included herein and disclosed herein; for example, the amount of chromium may be from a lower limit of 0.05, 0.1, 0.5, 1, 1.5, 2, or 2.5 weight percent to an upper limit of 0.1, 0.5, 1, 1.5, 2, 2.5, or 3.0 weight percent based on the total weight of the support and the catalyst. The chromium oxide based catalyst may have from 1.5 to 9.0 weight percent titanium based on the total weight of the support and the catalyst. All individual values and subranges from 1.5 to 9.0 weight percent are included herein and disclosed herein; for example, the amount of titanium may be from a lower limit of 1.5, 2.5, 3.5, 4.5, 6.5, 7.5, or 8.5 weight percent to an upper limit of 2, 3, 4, 5, 6, 7, 8, or 9 weight percent based on the total weight of the support and the catalyst.

In an alternative embodiment, the instant invention provides a polyethylene composition and articles made therefrom, in accordance with any of the embodiments disclosed herein, except that the polyethylene composition has a vinyl unsaturation of less than 1 vinyl per one thousand carbon atoms present in the backbone of the polyethylene. All individual values and subranges from less than 1 vinyl per one thousand carbon atoms present in the backbone of the polyethylene are disclosed herein and disclosed herein. For example, the vinyl unsaturation may be less than 1 vinyl per one thousand carbon atoms present in the backbone of the polyethylene, or in the alternative, the vinyl unsaturation may be less than 0.95 vinyl per one thousand carbon atoms present in the backbone of the polyethylene, or in the alternative, the vinyl unsaturation may be less than 0.93 vinyl per one thousand carbon atoms present in the backbone of the polyethylene, or in the alternative, the vinyl unsaturation may be less than 0.9 vinyl per one thousand carbon atoms present in the backbone of the polyethylene. In an alternative embodiment, the instant invention provides a polyethylene composition and articles made therefrom, in accordance with any of the embodiments disclosed herein, except that the polyethylene composition has a vinyl unsaturation of at least 0.5 vinyl per one thousand carbon atoms present in the backbone of the polyethylene In an alternative embodiment, the instant invention provides a polyethylene composition and articles made therefrom, in accordance with any of the embodiments disclosed herein, except that the polyethylene composition has a complex viscosity ($\eta^*$), determined at 0.02 $s^{-1}$ and 190° C., of at least 100,000 Pa·s. All individual values and subranges from at least 100,000 Pa·s are included herein and disclosed herein. For example, the polyethylene composition may have an $\eta^*$ at 0.02 $s^{-1}$ and 190° C. of at least 100,000 Pa·s, or in the alternative, the polyethylene composition may have an $\eta^*$ at 0.02 $s^{-1}$ and 190° C. of at least 105,000 Pa·s, or in the alternative, the polyethylene composition may have an $\eta^*$ at 0.02 $s^{-1}$ and 190° C. of at least 110,000 Pa·s, or in the alternative, the polyethylene composition may have an $\eta^*$ at 0.02 $s^{-1}$ and 190° C. of at least 112,000 Pa·s. In an alternative embodiment, the instant invention provides a polyethylene composition and articles made therefrom, in accordance with any of the embodiments disclosed herein, except that the polyethylene composition may have an $\eta^*$ at 0.02 $s^{-1}$ and 190° C. of no more than 300,000 Pa·s.

In an alternative embodiment, the instant invention provides a polyethylene composition and articles made therefrom, in accordance with any of the embodiments disclosed herein, except that the polyethylene composition has a ratio of $\eta^*$ at 0.02 $s^{-1}$ and 190° C. to $\eta^*$ at 200 $s^{-1}$ and 190° C. of greater than 85. All individual values and subranges of greater than 90 are included herein and disclosed herein. For example, the polyethylene composition may have a ratio of $\eta^*$ at 0.02 $s^{-1}$ and 190° C. to $\eta^*$ at 200 $s^{-1}$ and 190° C. of greater than 85, or in the alternative, the polyethylene composition may have a ratio of $\eta^*$ at 0.02 $s^{-1}$ and 190° C. to $\eta^*$ at 200 $s^{-1}$ and 190° C. of greater than 90, or in the alternative, the polyethylene composition may have a ratio of $\eta^*$ at 0.02 $s^{-1}$ and 190° C. to $\eta^*$ at 200 $s^{-1}$ and 190° C. of greater than 94, or in the alternative, the polyethylene composition may have a ratio of $\eta^*$ at 0.02 $s^{-1}$ and 190° C. to $\eta^*$ at 200 $s^{-1}$ and 190° C. of greater than 96. In an alternative embodiment, the instant invention provides a polyethylene composition and articles made therefrom, in accordance with any of the embodiments disclosed herein, except that the polyethylene composition has a ratio of $\eta^*$ at 0.02 $s^{-1}$ and 190° C. to $\eta^*$ at 200 $s^{-1}$ and 190° C. of less than 250.

In an alternative embodiment, the instant invention provides a polyethylene composition and articles made therefrom, in accordance with any of the embodiments disclosed herein, except that the article exhibits one or more of the following properties: a 45 degree gloss of at least 10%, a total haze of less than 60%. All individual values and subranges from at least 10% are included herein and disclosed herein. For example, the article may have a 45 degree gloss of at least 10%, or in the alternative, the article may have a 45 degree gloss of at least 12%, or in the alternative, the article may have a 45 degree gloss of at least 14%, or in the alternative, the article may have a 45 degree gloss of at least 15%. All individual values and subranges of less than 60% total haze are included herein and disclosed herein. For example, the article may have a haze of less than 60%, or in the alternative, the article may have a haze of less than 58%, or in the alternative, the article may have a haze of less than 55%, or in the alternative, the article may have a haze of less than 50%, or in the alternative, the article may have a haze of less than 45%, or in the alternative, the article may have a haze of less than 44%.

In an alternative embodiment, the instant invention provides a polyethylene composition and articles made therefrom, in accordance with any of the embodiments disclosed herein, except that the article is an extrusion blow molded article.

In an alternative embodiment, the instant invention provides a polyethylene composition and articles made therefrom, in accordance with any of the embodiments disclosed herein, except that the article is a film comprising at least one layer which comprises a polyethylene composition in accordance with any one of the embodiments described herein.

In an alternative embodiment, the instant invention provides a polyethylene composition and articles made therefrom, in accordance with any of the embodiments disclosed herein, except that the article is a film which is a shrink film.

In an alternative embodiment, the instant invention provides a polyethylene composition and articles made therefrom, in accordance with any of the embodiments disclosed herein, except that the article is a film which is a heavy duty shipping sack.

In an alternative embodiment, the instant invention provides a polyethylene composition and articles made therefrom, in accordance with any of the embodiments disclosed herein, except that the article is a film which is a the polyethylene composition further comprises one or more additives selected from the group consisting of processing aids, acid neutralizers, UV stabilizers, antioxidants, process stabilizers, metal deactivators, additives to improve oxidative or chlorine resistance, pigments and colorants.

Any conventional ethylene (co)polymerization reaction may be employed to produce the inventive polyethylene composition. Such conventional ethylene (co)polymerization reactions include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the inventive polyethylene composition may be produced in a high pressure reactor via a coordination catalyst system. For example, the inventive polyethylene composition according to the instant invention may be produced via gas phase polymerization process in a gas phase reactor; however, the instant invention is not so limited, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the polymerization reactor is a continuous polymerization reactor comprising a feed stream or gas cycle comprising ethylene and optionally one or more comonomers such as one or more α-olefins flowed continuously through the polymerization reactor by any suitable means.

In production, a chromium oxide catalyst, as described hereinbelow in further details, ethylene, optionally one or more alpha-olefin comonomers, hydrogen, optionally $O_2$, optionally one or more inert gases and/or liquids, e.g. $N_2$, isopentane, hexane, and optionally one or more continuity additives, e.g. ethoxylated stearil amine are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atmospheres (atm), preferably 17 to 26 atm. A distributor plate at the bottom of the polymer bed provides a uniform flow of the upflowing monomer, comonomer, inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the inventive polyethylene composition is exposed to oxygen. The inventive polyethylene composition may be then transferred to an extruder to be pelletized. Such pelletization techniques are generally known. The inventive polyethylene composition may further be melt screened. Subsequent to the melting process in the extruder, the molten composition is passed through one or more active screens (positioned in series of more than one) with each active screen having a micron retention size of from about 2 to about 400 (2 to $4 \times 10^{-5}$ m), and preferably about 2 to about 300 (2 to $3 \times 10^{-5}$ m), and most preferably about 2 to about 70 (2 to $7 \times 10^{-6}$ m), at a mass flux of about 5 to about 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and at least one other α-olefin, and may also include condensing agents as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 msec and in some embodiments, no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. That gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes, which contain liquid in the cycle gas stream and those which do not and vice versa. Such deflectors are described in the U.S. Pat. No. 4,933,149 and U.S. Pat. No. 6,627,713.

The chromium oxide-based catalyst system used in the fluidized bed is preferably stored for service in a reservoir under a blanket of a gas, which is inert to the stored material, such as nitrogen or argon. The chromium oxide-based catalyst system may be added to the reaction system, or reactor, at any point and by any suitable means, and is preferably added to the reaction system either directly into the fluidized bed or downstream of the last heat exchanger, i.e. the exchanger farthest downstream relative to the flow, in the recycle line, in which case the activator is fed into the bed or recycle line from a dispenser. The chromium oxide-based catalyst system is injected into the bed at a point above distributor plate. Preferably, the chromium oxide-based catalyst system is injected at a point in the bed where good mixing with polymer particles occurs. Injecting the chromium oxide-based catalyst system at a point above the distribution plate provides satisfactory operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of inventive polyethylene composition may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of inventive polyethylene composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C. or 75° C., or 80° C. to 90° C. or 95° C. or 100° C. or 110° C. or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s).

The process of the present invention is suitable for the production of homopolymers comprising ethylene derived units, or copolymers comprising ethylene derived units and at least one or more other olefin(s) derived units.

In order to maintain an adequate catalyst productivity in the present invention, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa).

The comonomer, e.g. one or more α-olefin comonomers, if present in the polymerization reactor, is present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas.

Hydrogen gas may also be added to the polymerization reactor(s) to control the final properties (e.g., $I_{21}$ and/or $I_2$) of the inventive polyethylene composition.

EXAMPLES

The following examples illustrate the present invention but are not intended to limit the scope of the invention. Inventive Examples 1-5 and Comparative Examples 1-4 were prepared. The reactor conditions and catalyst types are shown in Table 1A for the Inventive Examples. Table 1B provides reactor conditions and catalyst type for Comparative Example 3. Table 1C provides reactor conditions and catalyst type for Comparative Example 1 and Table 1D provides reactor conditions and catalyst type for Comparative Example 4. UCAT™ G-150, UCAT™ B-300, UCAT™ B-375, and UCAT™ B-400 catalysts are commercially available from Univation Technologies. The Inventive and Comparative Example resins were stabilized with antioxidants.

TABLE 1A

| | CATALYST | | | | |
|---|---|---|---|---|---|
| | UCAT™ B-375 | UCAT™ B-375 | UCAT™ B-300 | UCAT™ B-300 | UCAT™ B-400 |
| | EXAMPLE | | | | |
| REACTION CONDITIONS | Inv. Ex. 1 | Inv. Ex. 2 | Inv. Ex. 3 | Inv. Ex. 4 | Inv. Ex. 5 |
| Temp. ° C. | 94.6 | 94.5 | 95.4 | 95.4 | 97.7 |
| Pressure, psig | 348 | 348 | 349 | 348 | 348 |
| $C_2$ Partial Pressure, psi | 220 | 220 | 220 | 220 | 220 |
| $H_2/C_2$ Molar Ratio | 0.050 | 0.050 | 0.050 | 0.050 | 0.050 |
| $C_6/C_2$ Molar Ratio | 0.013 | 0.013 | 0.013 | 0.013 | 0.011 |
| Isopentane mol % | 2.0 | 2.0 | 2.0 | 2.0 | 2.0 |
| $O_2/C_2$ (ppbv) | 90 | 90 | 175 | 175 | 175 |
| Production Rate, lb/hr | 25.6 | 28.5 | 29.2 | 29.3 | 37.5 |
| Bed Weight, lbs | 126 | 125 | 140 | 140 | 160 |
| FBD (fluidized bulk density), lb/ft$^3$ | 15.5 | 15.9 | 17.5 | 17.9 | 19.4 |
| Bed Volume, ft$^3$ | 8.1 | 7.9 | 8.0 | 7.8 | 8.2 |
| Residence Time, hr | 4.9 | 4.4 | 4.8 | 4.8 | 4.3 |
| STY (space time yield), lb/hr/ft$^3$ | 3.2 | 3.6 | 3.7 | 3.7 | 4.6 |

TABLE 1B

| | CATALYST UCAT™ G-150 |
|---|---|
| | EXAMPLE |
| REACTION CONDITIONS | Comp. Ex. 3 |
| Temp., ° C. | 93.5-99.5 |
| Pressure, psig | 348 |
| $C_2$ Partial Pressure, psi | 210-260 |
| $H_2/C_2$ Molar Ratio | 0.050 |
| $C_6/C_2$ Molar Ratio | 0.011-0.021 |
| Isopentane, % | 0.0-4.0 |
| $O_2/C_2$ (ppbv) | 20 |
| Production Rate, lb/hr | 40,000-60,000 |
| FBD, lb/ft$^3$ | 20.0-23.0 |
| Bed Height, ft | 48-50 |
| Residence Time, hr | 3.25-4.5 |
| STY, lb/hr/ft$^3$ | 4.5-6.0 |

TABLE 1C

| | CATALYST UCAT J™ | |
|---|---|---|
| | EXAMPLE | |
| | Comp. Ex. 1 | |
| REACTION CONDITIONS | Reactor 1 | Reactor 2 |
| Temp. ° C. | 80 | 95 |
| Pressure, psig | 268 | 324 |
| $C_2$ Partial Pressure, psi | 40 | 75 |
| $H_2/C_2$ Molar Ratio | 0.03 | 0.6 |
| $C_6/C_2$ Molar Ratio | 0.066 | 0.025 |
| Isopentane % | 12.75 | 12.5 |
| Production Rate, Mlb/hr | 48.3 | 43.0 |
| FBD, lb/ft$^3$ | 14.5 | 19.0 |
| Bed Height, ft | 34 | 47 |
| Residence Time, hr | 1.9 | 2.0 |
| STY, lb/hr/ft$^3$ | 7.9 | 5.0 |

TABLE 1D

| | CATALYST UCAT™ G-150 |
|---|---|
| | EXAMPLE |
| REACTION CONDITIONS | Comp. Ex. 4 |
| Temp. ° C. | 93.8 |
| Pressure, psig | 348 |
| $C_2$ Partial Pressure, psi | 220 |
| $H_2/C_2$ Molar Ratio | 0.050 |
| $C_6/C_2$ Molar Ratio | 0.018 |
| Isopentane mol % | 2.0 |
| $O_2/C_2$ (ppbv) | 0 |
| Production Rate, lb/hr | 34.0 |
| Bed Weight, lbs | 159 |
| FBD (fluidized bulk density), lb/ft$^3$ | 20.0 |
| Bed Volume, ft$^3$ | 7.9 |
| Residence Time, hr | 4.7 |
| STY (space time yield), lb/hr/ft$^3$ | 4.3 |

Tables 2 and 3 provide the polymer characteristics for each of Inventive Examples 1-5 and Comparative Examples 1-4, respectively.

TABLE 2

| | Sample | | | | |
|---|---|---|---|---|---|
| | Inv. Ex. 1 | Inv. Ex. 2 | Inv. Ex. 3 | Inv. Ex. 4 | Inv. Ex. 5 |
| Reactor Configuration | Single | Single | Single | Single | Single |
| Process | Gas Phase | Gas Phase | Gas Phase | Gas Phase | Gas Phase |
| Catalyst | UCAT ™ B-375 | UCAT ™ B-375 | UCAT ™ B-300 | UCAT ™ B-300 | UCAT ™ B-400 |
| Density, g/cm$^3$ | 0.9372 | 0.9369 | 0.9367 | 0.9366 | 0.9364 |
| $I_2$, g/10 min | 0.11 | 0.11 | 0.12 | 0.13 | 0.14 |
| $I_5$, g/10 min | 0.61 | 0.67 | 0.73 | 0.98 | 0.68 |
| $I_{10}$, g/10 min | 2.64 | 2.62 | 2.51 | 2.62 | 2.77 |
| $I_{21}$, g/10 min | 14.02 | 15.65 | 15.36 | 15.31 | 13.67 |
| Tc, ° C. | 113.9 | 114.0 | 113.8 | 113.9 | 114.3 |
| ΔH cryst, J/g | 175.7 | 174.9 | 174.5 | 168.3 | 175.1 |
| Tm ° C. | 125.4 | 125.1 | 125.6 | 125.5 | 125.4 |
| ΔH melt, J/g | 176.5 | 176.8 | 175.4 | 172.2 | 176.5 |
| Vinyls per 1000 Carbons (ASTM D6248) | 0.941 | 0.944 | 0.927 | 0.93 | 0.853 |

TABLE 3

| | Sample | | | |
|---|---|---|---|---|
| | Comp. Ex. 1 | Comp. Ex. 2 | Comp. Ex. 3 | Comp. Ex. 4 |
| Reactor Configuration | Dual | Single | Single | Single |
| Process | Gas Phase | — | Gas Phase | Gas Phase |
| Catalyst Type or Catalyst | Ziegler-Natta | — | UCAT ™ G-150 | UCAT ™ G-150 |
| Density, g/cm$^3$ | 0.9407 | 0.937 | 0.9398 | 0.9366 |
| $I_2$, g/10 min | 0.15 | 0.25 | 0.14 | 0.20 |
| $I_5$, g/10 min | 0.52 | 1.09 | 0.85 | 1.04 |
| $I_{10}$, g/10 min | 1.87 | 3.82 | 2.94 | 3.92 |
| $I_{21}$, g/10 min | 8.75 | 19.26 | 18.59 | 22.54 |
| Tc, ° C. | 115.9 | 114.9 | 115.4 | 114.4 |
| ΔH cryst, J/g | 181.3 | 178.2 | 183.7 | 175.6 |
| Tm, ° C. | 128.5 | 126.0 | 126.0 | 125.7 |
| ΔH melt, J/g | 186.2 | 180.6 | 184.7 | 175.6 |
| Vinyls per 1000 Carbons (ASTM D6248) | 0.168 | 1.031 | 1.3 | 0.952 |

Comp. Ex. 2 is a medium density polyethylene resin commercially available from Chevron Phillips Chemical Company LP, under the tradename MARFLEX HHM TR-130.

Film Fabrication Conditions

Mono layer blown films were fabricated from the comparative and inventive resins on a 3½ inch, 30:1 L/D Sterling extruder. The extrusion line is equipped with internal bubble cooling. Additional film fabrication conditions include:
Die diameter: 8 inch
Die gap: 70 mil
Rate: 15-16 lb/h/inch
BUR: 2.5:1
Film thickness: 2 mil
Lay flat: 31.4 inch
Additional conditions are provided in Table 4.

TABLE 4

| Sample | Melt Temperature (° F.) | Melt Pressure Screen (psi) | Melt Pressure Adapter (psi) | Rate/rpm | Rate (lb/hr) |
|---|---|---|---|---|---|
| Comp. Ex. 2 | 502 | 4,480 | 1,810 | 6.5 | 387 |
| Comp. Ex. 3 | 497 | 4,090 | 1,590 | 5.9 | 387 |
| Comp. Ex. 4 | 494 | 3,920 | 1,790 | 6.1 | 385 |
| Inv. Ex. 1 | 496 | 4,090 | 1,580 | 6.7 | 386 |
| Inv. Ex. 2 | 496 | 3,930 | 1,810 | 6.4 | 388 |
| Inv. Ex. 3 | 500 | 4,240 | 1,890 | 6.4 | 387 |
| Inv. Ex. 4 | 500 | 4,240 | 1,850 | 6.4 | 385 |
| Inv. Ex. 5 | 502 | 4,370 | 1,480 | 6.6 | 386 |

Molecular weight data for each of the Comparative and Inventive Examples is shown in Table 5. Table 6 provides the viscoelastic property data for each of the Comparative and Inventive Examples. Table 7 provides optical property data for each of the Inventive Examples and Comparative Examples 2-4.

TABLE 5

| | Conventional GPC | | | | |
|---|---|---|---|---|---|
| | Mn | Mw | Mz | Mw/Mn | Mz/Mw |
| Comp. Ex. 1 | 19,720 | 184,160 | 724,500 | 9.3 | 3.9 |
| Comp. Ex. 2 | 11,420 | 150,030 | 756,800 | 13.1 | 5.0 |
| Comp. Ex. 3 | 8,390 | 161,420 | 996,800 | 19.2 | 6.2 |
| Comp. Ex. 4 | 9,480 | 163,350 | 1,031,000 | 17.2 | 6.3 |
| Inv. Ex. 1 | 9,530 | 121,580 | 493,700 | 12.8 | 4.1 |
| Inv. Ex. 2 | 9,870 | 120,960 | 485,700 | 12.3 | 4.0 |
| Inv. Ex. 3 | 10,560 | 125,380 | 519,100 | 11.9 | 4.1 |
| Inv. Ex. 4 | 9,990 | 127,160 | 563,400 | 12.7 | 4.4 |
| Inv. Ex. 5 | 11,160 | 128,980 | 536,900 | 11.6 | 4.2 |

TABLE 6

| Sample | $\eta^*$ at 0.02 s$^{-1}$, 190° C. (Pa · s) | ($\eta^*$ at 0.02 s$^{-1}$, 190° C.)/ ($\eta^*$ at 200 s$^{-1}$, 190° C.) | tan delta at 0.02 s$^{-1}$, 190° C. | (tan delta at 0.02 s$^{-1}$, 190° C.)/(tan delta at 200 s$^{-1}$, 190° C.) |
|---|---|---|---|---|
| Comp. Ex. 1 | 71,395 | 45 | 3.33 | 5.56 |
| Comp. Ex. 2 | 60,975 | 54 | 2.11 | 3.14 |
| Comp. Ex. 3 | 96,313 | 105 | 1.38 | 2.23 |
| Comp. Ex. 4 | 83,071 | 83 | 1.61 | 2.47 |
| Inv. Ex. 1 | 144,818 | 136 | 1.31 | 2.10 |
| Inv. Ex. 2 | 140,184 | 134 | 1.31 | 2.09 |
| Inv. Ex. 3 | 119,469 | 109 | 1.42 | 2.22 |
| Inv. Ex. 4 | 114,078 | 104 | 1.45 | 2.24 |
| Inv. Ex. 5 | 112,019 | 98 | 1.47 | 2.27 |

TABLE 7

| Sample | Total Haze ASTM D1003 % | External Haze ASTM D1003 % | Gloss at 45° ASTM D2457 % |
|---|---|---|---|
| Comp. Ex. 2 | 63 | 56 | 9 |
| Comp. Ex. 3 | 67 | 60 | 11 |
| Comp. Ex. 4 | 71 | 63 | 8 |
| Inv. Ex. 1 | 39 | 35 | 16 |
| Inv. Ex. 2 | 38 | 34 | 17 |
| Inv. Ex. 3 | 40 | 35 | 16 |
| Inv. Ex. 4 | 41 | 36 | 15 |

TABLE 7-continued

| Sample | Total Haze ASTM D1003 % | External Haze ASTM D1003 % | Gloss at 45° ASTM D2457 % |
|---|---|---|---|
| Inv. Ex. 5 | 40 | 36 | 16 |

As can be seen by the foregoing and FIGS. 1-3, the inventive composition results in a molded article with a balance of good optical properties, e.g. low haze and high clarity, and melt strength.

Test Methods

Test methods include the following:

Density

Resin density was measured by the Archimedes displacement method, ASTM D792, Method B, in isopropanol. Specimens were measured within one hour of molding, after conditioning in the isopropanol bath, at 23° C., for eight minutes, to achieve thermal equilibrium prior to measurement. The specimens were compression molded according to ASTM D4703, Annex A-1, per Procedure C.

Melt Flow Rate by Extrusion Plastomer

Melt flow rate measurements were performed according to ASTM D1238, Condition 190° C., 2.16 kg, Condition 190° C., 5 kg, Condition 190° C., 10 kg and Condition 190° C., 21.6 kg, which are known as $I_2$, $I_5$, $I_{10}$ and $I_{21}$, respectively. Melt flow rate is inversely proportional to the molecular weight of the polymer. Thus, the higher the molecular weight, the lower the melt flow rate, although the relationship is not linear.

Differential Scanning Calorimetry (DSC)

The peak melting temperature ($T_m$), heat of fusion ($\Delta$Hm), peak crystallization temperature (Tc), and heat of crystallization ($\Delta$Hc), were generated via a TA Instruments Model Q1000 DSC, equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. A "6 mm diameter" disk (about 3 to 10 mg) was cut from the film using a paper hole punch, weighed to the nearest 0.001 mg, placed in a light aluminum pan (ca 50 mg) and then crimped shut.

The thermal behavior of the sample was investigated with the following temperature profile. The sample was rapidly heated to 180° C., and held isothermal for three minutes, in order to remove any previous thermal history. The sample was then cooled to −40° C., at 10° C./min cooling rate, and was held at −40° C. for three minutes. The sample was then heated to 150° C. at 10° C./min heating rate. The cooling and second heating curves were recorded. The Tc and $\Delta$Hc were determined from the cooling curve, and the Tm and $\Delta$Hm were determined from the second heating curve.

Molecular Weight (MW) and Molecular Weight Distribution (MWD) Determination by GPC Conventional Data from Triple Detector GPC A high temperature Triple Detector Gel Permeation Chromatography (3D-GPC) system consisting of a Waters (Milford, Mass.) 150 C high temperature chromatograph, equipped with an Infra-red detector (IR4 from PolymerChar, Valencia, Spain) was used. Concentration was measured with the Infra-red detector.

Data collection was performed using Viscotek TriSEC software Version 3 and a 4-channel Viscotek Data Manager DM400. The carrier solvent was 1,2,4-trichlorobenzene (TCB). The system was equipped with an on-line solvent degas device from Polymer Laboratories. The carousel compartment was operated at 150° C., and the column compartment was operated at 150° C. The columns were four Polymer Laboratories Mixed-A 30 cm, 20 micron columns. The samples were prepared at a concentration of 0.1 grams of polymer in 50 ml of TCB. The chromatographic solvent (TCB) and the sample preparation solvent contained 200 ppm of butylated hydroxytoluene (BHT) and both solvent sources were nitrogen sparged. Polyethylene samples were stirred gently at 160° C. for 4 hours. The injection volume was 200 µl, and the flow rate was 1.0 ml/minute.

Calibration of the GPC column set was performed with 21 narrow molecular weight distribution polystyrene standards. The molecular weights of the standards ranged from 580 to 8,400,000 g/mol, and were arranged in 6 "cocktail" mixtures, with at least a decade of separation between individual molecular weights. The polystyrene standard peak molecular weights were converted to polyethylene molecular weights using the following equation (as described in Williams and Ward, J. Polym. Sci., Polym. Let., 6, 621 (1968)):

$$M_{polyethylene} = A(M_{polystyrene})^B \quad (1)$$

Here B has a value of 1.0, and the experimentally determined value of A is around 0.38.

A first order polynomial was used to fit the respective polyethylene-equivalent calibration points obtained from equation (1) to their observed elution volumes. The actual polynomial fit was obtained so as to relate the logarithm of polyethylene equivalent molecular weights to the observed elution volumes (and associated powers) for each polystyrene standard.

Number, weight, and z-average molecular weights were calculated according to the following equations:

$$\overline{Mn} = \frac{\sum_{i} Wf_i}{\sum_{i} (Wf_i/M_i)} \quad (2)$$

$$\overline{Mw} = \frac{\sum_{i} (Wf_i * M_i)}{\sum_{i} Wf_i} \quad (3)$$

$$\overline{Mz} = \frac{\sum_{i} (Wf_i * M_i^2)}{\sum_{i} (Wf_i * M_i)} \quad (4)$$

where, $Wf_i$ is the weight fraction of the i-th component and $M_i$ is the molecular weight of the i-th component.

The molecular weight distribution MWD was expressed as the ratio of the weight average molecular weight (Mw) to the number average molecular weight (Mn) or the ratio of the z-average molecular weight (Mz) to the weight average molecular weight (Mw).

The A value was determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 115,000 g/mol.

Rheology DMS

Each sample was compression molded into a disk for rheology measurement. The disks were prepared by pressing the samples into "3.0 mm thick" plaques, and were subsequently cut into "25 mm diameter" disks. The compression molding procedure was as follows: 350° F. (177° C.) for five minutes, at 1500 psi (10.3 MPa), under N2 purge protection, then the chase was transferred into an ambient temperature oven, with N2 purge, until the sample plaque was solidified, and then the plaque was removed from the chase.

The resin rheology was measured on the ARES-LS model Rheometer from TA Instruments. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties, such as modulus and viscosity. The viscoelastic properties of the sample were measured, in the melt, using a "25 mm diameter" parallel plate set up, at 190° C., and as a function of varying frequency (range 0.01 $s^{-1}$ to 500 $s^{-1}$). A small constant strain (5%) was applied to ensure the measurement was in the linear viscoelastic region. The storage modulus (G'), loss modulus (G"), tan delta (G"/G'), and complex viscosity (eta* or $\eta^*$) of the resin were determined using Rheometrics Orchestrator software (v. 6.5.8).

Melt Strength

The Rheotens (Goettfert Inc., Rock Hill, S.C., USA) melt strength measurement was carried out at 190° C. The melt was produced by a Goettfert Rheotester 2000 capillary rheometer with a flat, 30/2 die, at a shear rate of 38.2 $s^{-1}$. The barrel of the rheometer (diameter: 12 mm) was filled in less than one minute. A delay of 10 minutes was allowed for proper melting. The take-up speed of the Rheotens wheels was varied, with a constant acceleration of 2.4 mm/sec$^2$. The tension in the drawn strand was monitored with time, until the strand broke. The steady-state force and the velocity at break were reported.

The present invention may be embodied in other forms without departing from the spirit and the essential attributes thereof, and, accordingly, reference should be made to the appended claims, rather than to the foregoing specification, as indicating the scope of the invention.

We claim:

1. A polyethylene composition comprising:
    at least 95 percent by weight of the units derived from ethylene;
    less than 5 percent by weight of units derived from one or more α-olefin comonomers;
    wherein said polyethylene composition has a density in the range of 0.930 to 0.945 g/cm$^3$, a molecular weight distribution characterized by the ratio of the z-average molecular weight to the weight average molecular weight (Mz/Mw) less than 5, a melt index, $I_2$ (measured at 190° C., 2.16 kg), in the range of 0.08 to 0.5 g/10 minutes, and a high flow melt index, $I_{21}$ (measured at 190° C., 21.6 kg), in the range from 10 to 20 g/10 minutes; and wherein the polyethylene composition has a vinyl unsaturation of less than 1 vinyls per one thousand carbon atoms present in the backbone of said composition, and wherein the polyethylene composition has a complex viscosity ratio, $\eta^*$ at 0.02 $s^{-1}$ and 190° C. to $\eta^*$ at 200 $s^{-1}$ and 190° C., greater than 90.

2. The polyethylene composition according to claim 1, wherein the polyethylene composition has a density from 0.934 to 0.942 g/cm$^3$.

3. The polyethylene composition according to claim 1, wherein the polyethylene composition has a complex viscosity ($\eta^*$), determined at 0.02 $s^{-1}$ and 190° C., of at least 100,000 Pa·s.

4. An article comprising the polyethylene composition according to claim 1, wherein the article exhibits one or more of the following properties: a 45 degree gloss of at least 10%, a total haze of less than 60%.

5. The article according to claim 4, wherein the article is an extrusion blow molded article.

6. The article according to claim 4, wherein the article is a film comprising at least one layer which comprises the polyethylene composition.

7. The film according to claim 6, wherein the film is a shrink film.

8. The polyethylene composition according to claim 1, wherein the polyethylene composition has a melt strength of 10 cN or greater, measured at 190° C.

9. The polyethylene composition according to claim 1, wherein the polyethylene composition is produced utilizing a chromium oxide catalyst.

10. The polyethylene composition according to claim 1, wherein the polyethylene composition has a ratio of the z-average molecular weight to the weight average molecular weight (Mz/Mw) of from 4.0 to less than 5.

* * * * *